(No Model.) 7 Sheets—Sheet 2.
W. ROBINSON.
RADIAL CAR TRUCK.
No. 554,956. Patented Feb. 18, 1896.
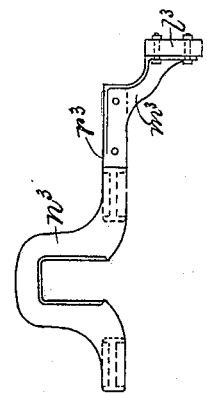
Fig 19
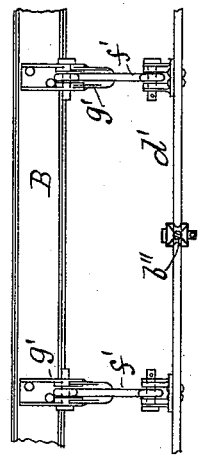
Fig 17
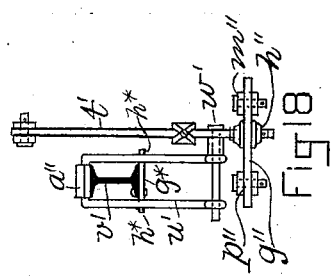
Fig 18
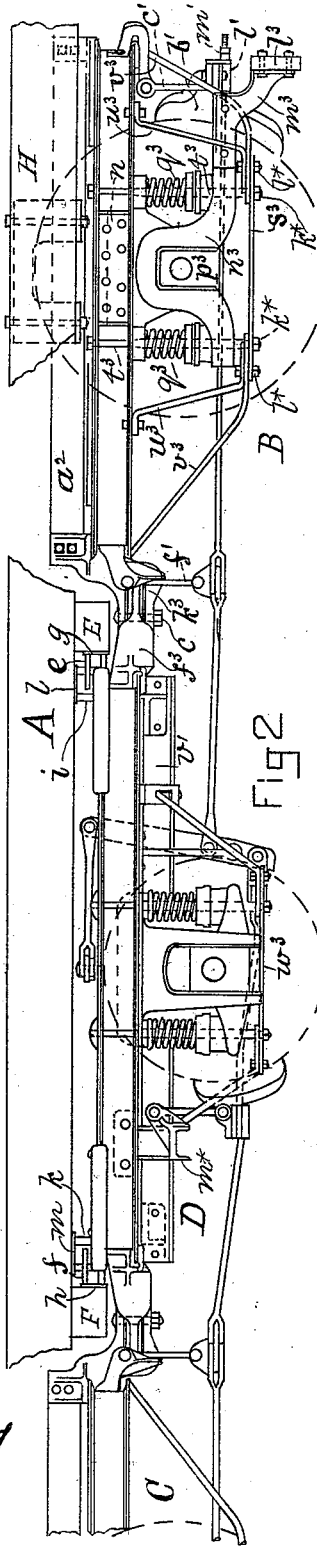
Fig 2
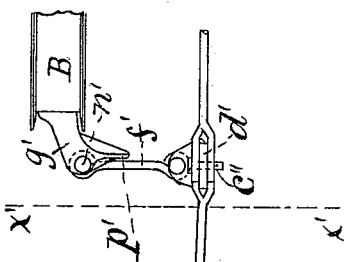
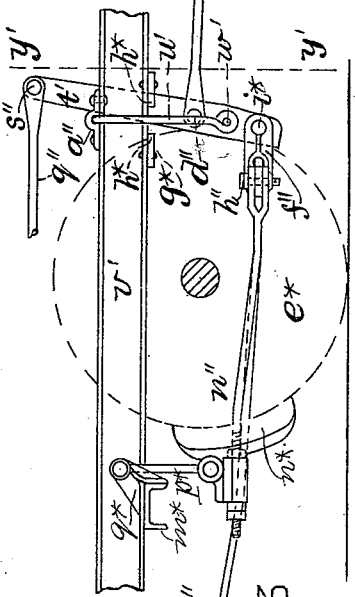
Fig 5
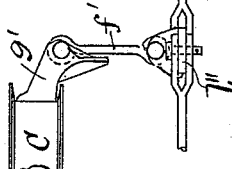
WITNESSES
J. McDonald
L. O'Neill.
INVENTOR
Wm Robinson

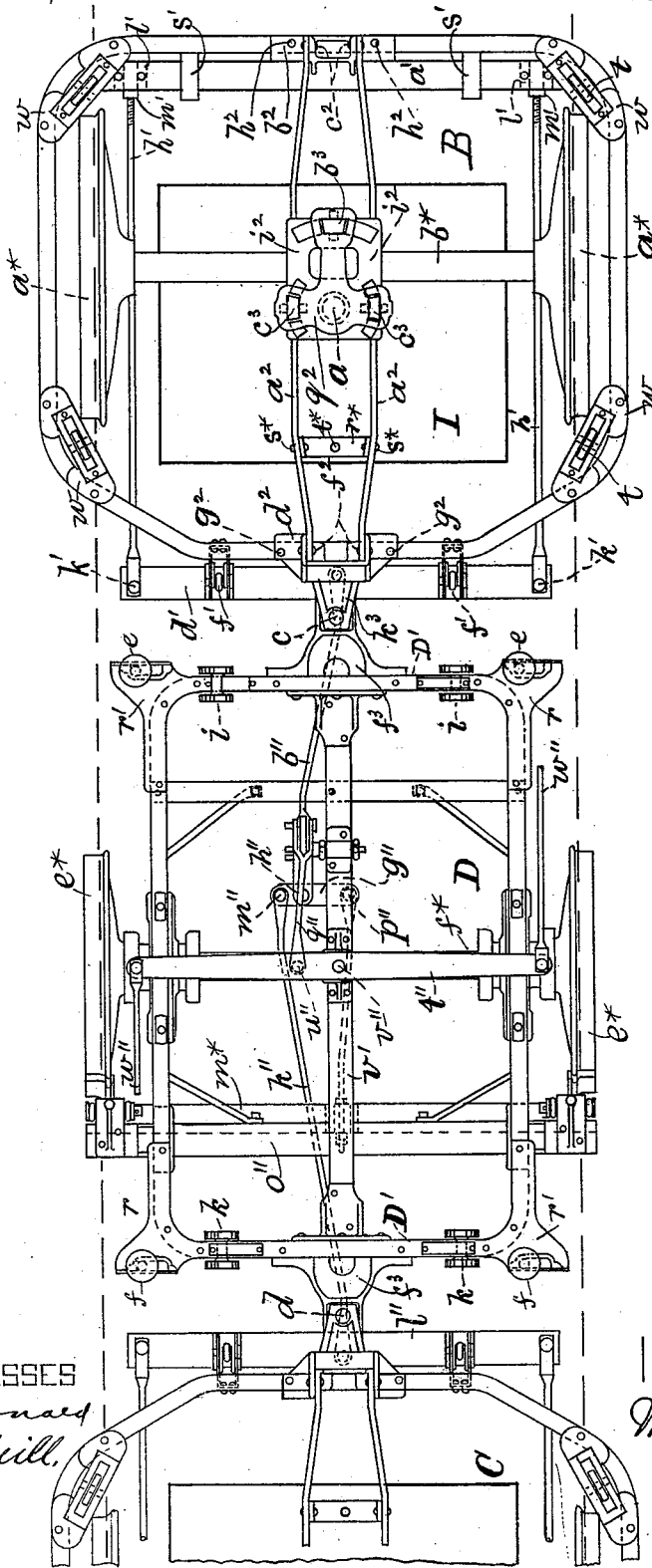

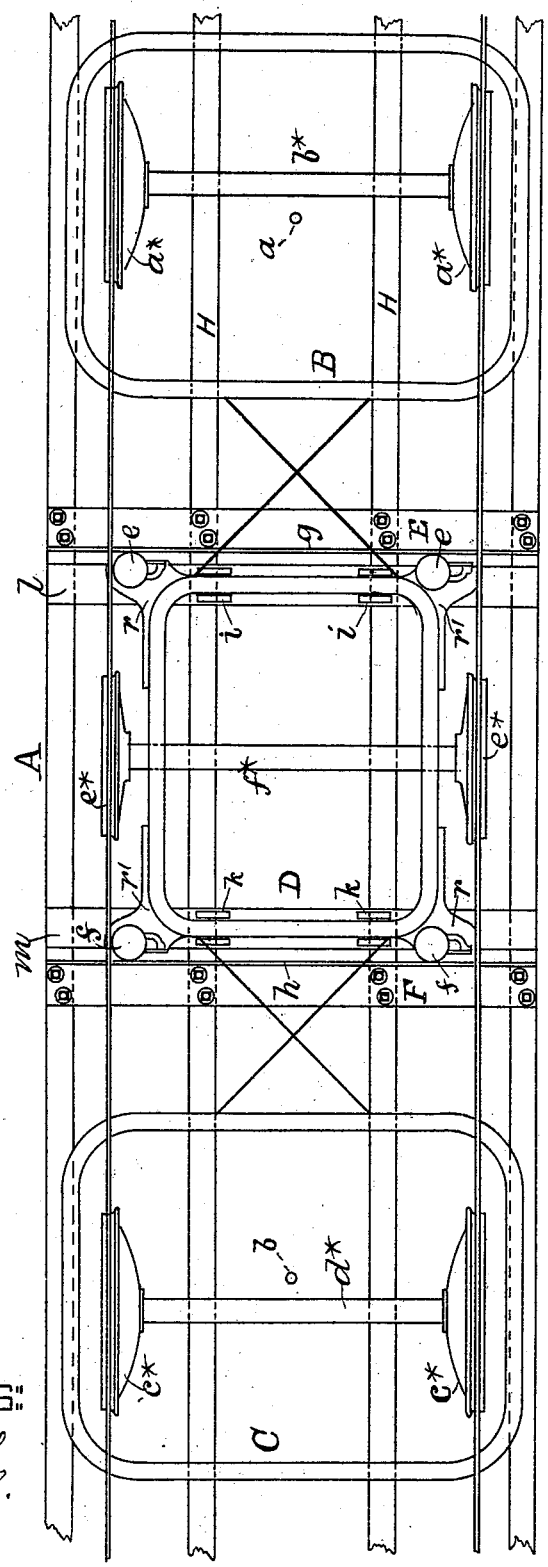

(No Model.)
W. ROBINSON.
RADIAL CAR TRUCK.
No. 554,956.  Patented Feb. 18, 1896.
7 Sheets—Sheet 4.
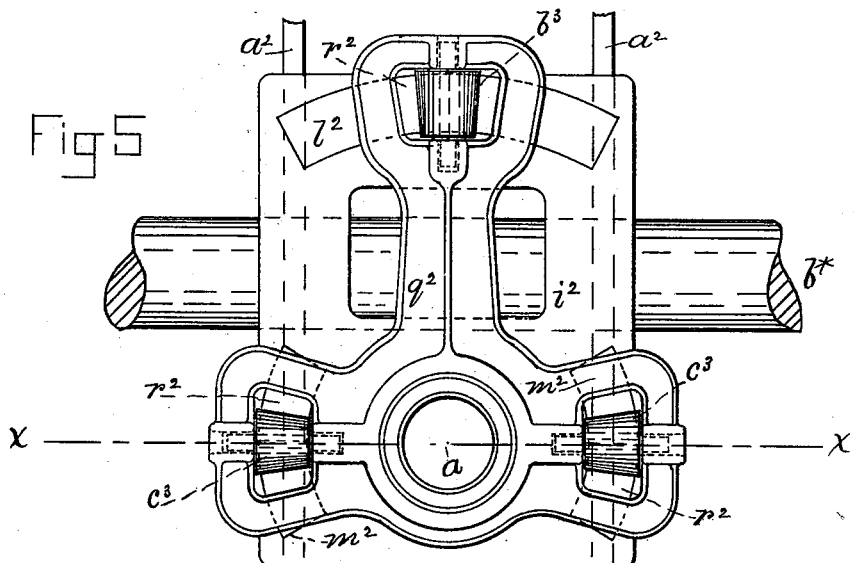
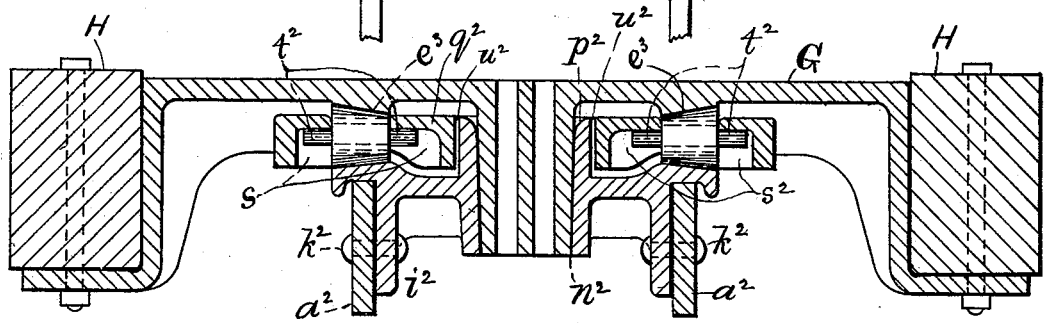
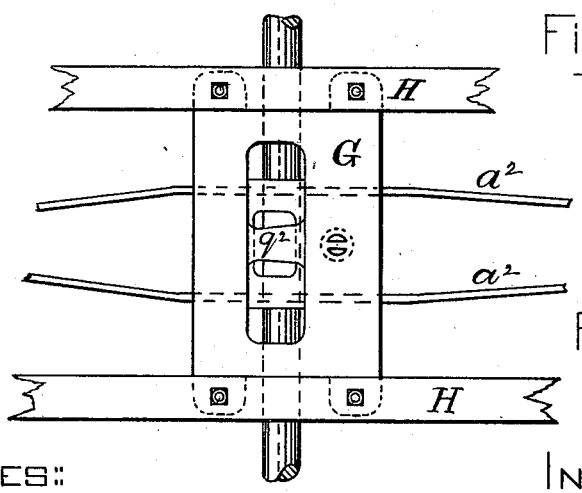
WITNESSES:
J. B. McDonald
L. O'Neill
INVENTOR:
Wm. Robinson.

(No Model.) 7 Sheets—Sheet 5.

W. ROBINSON.
RADIAL CAR TRUCK.

No. 554,956. Patented Feb. 18, 1896.

WITNESSES:
J. McDonald
L. O'Neill.

INVENTOR:
Wm. Robinson (No Model.) 7 Sheets—Sheet 6.
W. ROBINSON.
RADIAL CAR TRUCK.

No. 554,956. Patented Feb. 18, 1896.

WITNESSES:
J. J. McDonald.
D. O'Neill.

INVENTOR:
Wm. Robinson.

(No Model.) 7 Sheets—Sheet 7.
W. ROBINSON.
RADIAL CAR TRUCK.

No. 554,956. Patented Feb. 18, 1896.

WITNESSES:
J. MacDonald.
D. O'Neill.

INVENTOR:
Wm. Robinson.

UNITED STATES PATENT OFFICE.

WILLIAM ROBINSON, OF BOSTON, MASSACHUSETTS, ASSIGNOR TO THE ROBINSON RADIAL CAR TRUCK COMPANY, OF PORTLAND, MAINE.

RADIAL CAR-TRUCK.

SPECIFICATION forming part of Letters Patent No. 554,956, dated February 18, 1896.

Application filed July 14, 1891. Serial No. 399,444. (No model.)

*To all whom it may concern:*

Be it known that I, WILLIAM ROBINSON, a citizen of the United States, residing at Boston, in the county of Suffolk and State of Massachusetts, have invented a new and Improved Radial Car-Truck, of which the following is a specification.

The nature of my invention will be understood from the description which follows, reference being had to the accompanying drawings, which form a part of this specification, in which—

Figure 8:
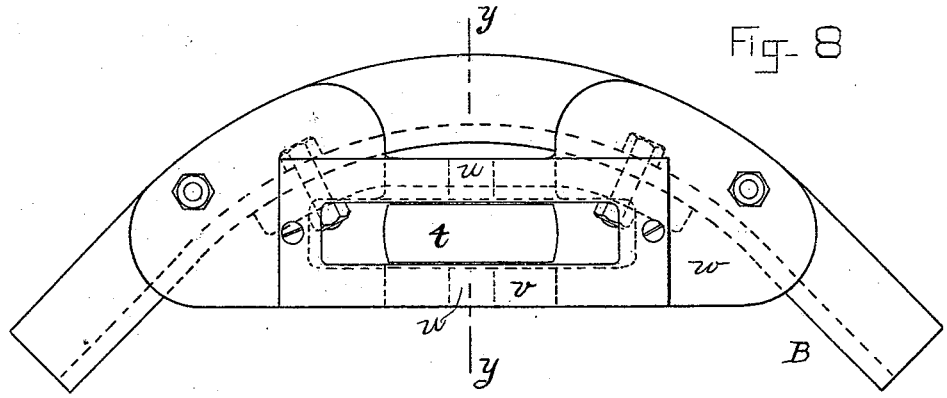
Figure 9:
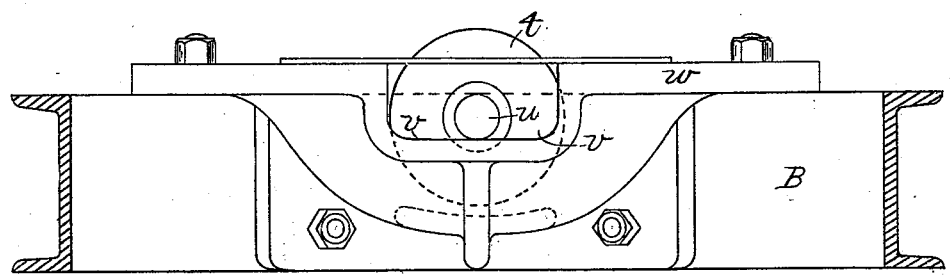
Figure 10:
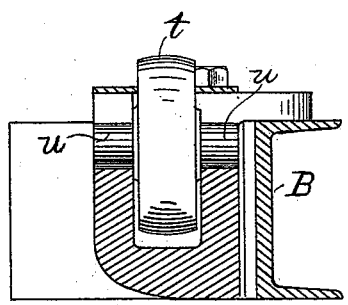
Figure 11:
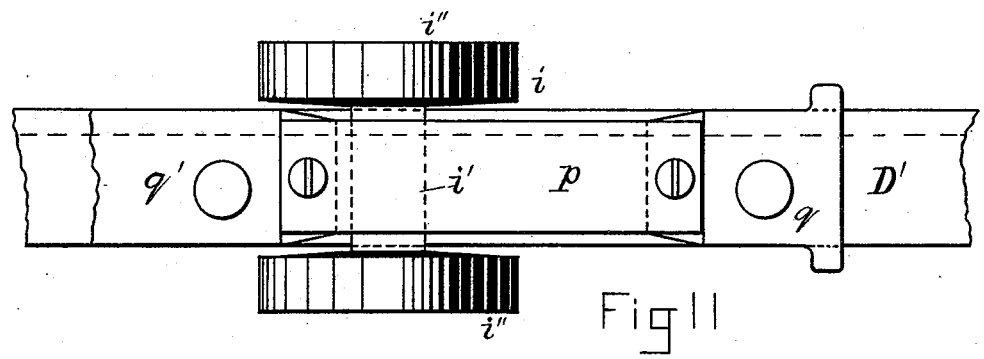
Figure 12:
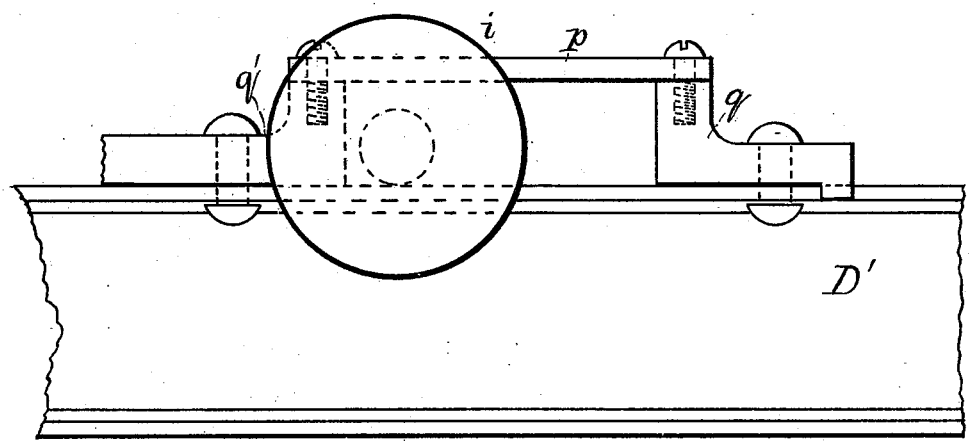
Figure 13:
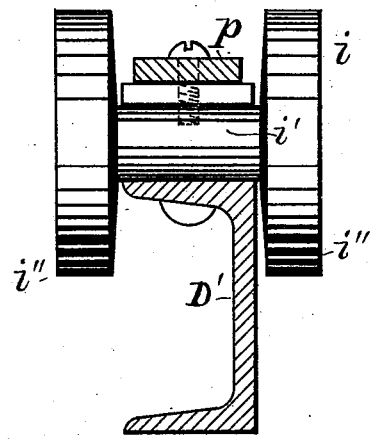
Figure 14:
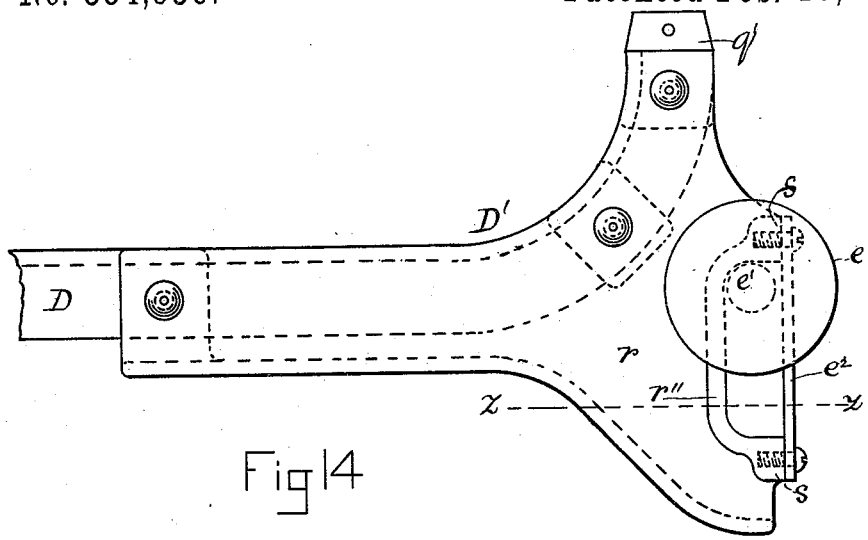
Figure 15:
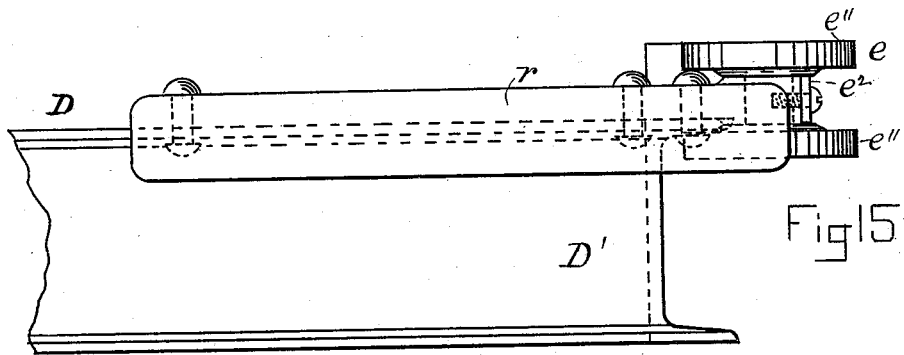
Figure 16:
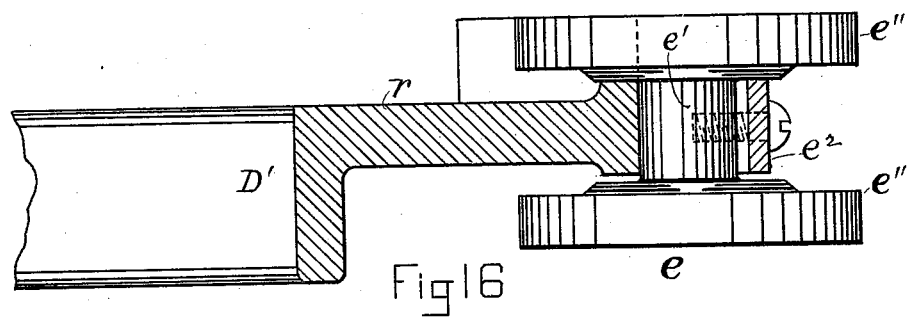

Figure 1 is a plan view of a six-wheeled radial car-truck, illustrating the principal features of my invention. Fig. 2 is a side elevation of the same, showing also portions of the car-framing. Fig. 3 is an enlarged elevation more clearly illustrating the principal features of the brake mechanism. Fig. 4 is a diagrammatic bottom plan view of the truck, showing its relation to the floor-framing of the car. Fig. 5 is an enlarged plan showing the center roller-bearings of the end or swiveling truck-frames. Fig. 6 is a cross-section through the line $x\ x$, Fig. 5, showing also a cross-section of the center plate secured to the car-body. Fig. 7 is a plan of said center plate and adjacent elements. Fig. 8 is a plan showing the corner roller-bearings of the swiveling truck-frame. Fig. 9 is an inner side view of the same, and Fig. 10 is a cross-section through the line $y\ y$, Fig. 8. Fig. 11 is an enlarged plan showing the vertical roller-bearing of the center truck-frame in place. Fig. 12 is a side elevation of the same, and Fig. 13 is an end elevation of the same, partly in section. Fig. 14 is an enlarged plan showing the side roller-bearing of the center truck-frame in position. Fig. 15 is an elevation of the same, and Fig. 16 is a cross-section through the line $z\ z$, Fig. 14. Fig. 17 is a cross-section through the line $x'\ x'$, Fig. 3, showing a portion of the brake mechanism; and Fig. 18 is a cross-section through the line $y'\ y'$, Fig. 3, showing another portion of the brake mechanism. Fig. 19 is a detached view showing the box, saddle and fender or motor-guard; and Fig. 20 is a plan, partly in section, showing the connection between the adjacent axle-frames.

Similar letters of reference indicate corresponding parts in all the figures.

A is a car-frame provided with two axle or truck frames B and C, swiveling, respectively, on the car-frame A at the points $a$ and $b$. Between the axle-frames B and C is located the axle-frame D, flexibly connected to the swiveling frames B and C, respectively, as shown at the points $c$ and $d$, Fig. 1.

The axle-frame B is provided with the wheels $a^*$ connected by the axle $b^*$ in the usual manner, and the axle-frame C is provided with the wheels $c^*$ connected by the axle $d^*$. The center frame D is also provided with the wheels $e^*$ connected by the axle $f^*$ in any usual or suitable manner.

The car-frame A is provided with the cross-timbers E F, between which the axle-frame D travels across the car-body A. The timbers E F have the vertical metal plates $g\ h$ secured to their sides facing each other, as shown, and the side rollers $e\ f$ of the axle-frame D bear against said plates $g\ h$, which form a track for the same.

The axle-frame D is provided with the vertical rollers $i\ k$, upon which rest the plates $l\ m$, which latter are secured to the car-frame A, and form tracks upon which said rollers $i\ k$ travel back and forth.

The frames B, C, and D are each made, preferably, of a single piece of steel channel-bar suitably bent at the corners and the ends brought together and secured by means of a fish-bar $n$, Fig. 2, securely riveted thereto.

The vertical rollers $i\ k$ of the center axle-frame D, are made preferably in the form of spools, as clearly shown in Figs. 11, 12, and 13. These spools are dropped over the sides of the frame D, the shank $i'$ of said spools resting upon the channel-bar D' of the frame D, as shown, while the heads $i''$ of said spools, dropping at opposite sides of said channel-bar, keep said spools in proper operative position. The plate $p$, secured to the stops $q\ q'$, which in turn are secured to the frame D, as shown, keeps the rollers $i\ k$ from being accidentally or intentionally removed in transit.

The stops $q\ q'$ project upwardly from the channel-bar D' of the frame D at approximately right angles to said bar D', leaving right angles at their point of junction with said bar, as shown. By this arrangement it is evident the shank $i'$ of the spool-roller can touch its track D' and one of the stops $q\ q'$ simultaneously at only two points, one point on the track D' and one point on the side of one of said stops, and these points are ninety degrees apart—that is, one-quarter the circumference of the shank $i'$. By this construction and arrangement I secure much less friction between the shank $i'$ and its bearings than when said bearings are of the usual semicircular form corresponding to the form of the shank of the roller. As a consequence my roller is sure to revolve and keep round under all conditions to which it may be subjected.

It will be observed that the spools $i\ k$ are differential rollers—that is, while the shank $i'$ travels a short distance on the frame D the plates $l\ m$ (in other words the car-frame) which rest upon the peripheries of said spool-heads $i''$ travel a considerable distance, since the diameter of said spool-heads $i''$ is much greater than the diameter of the shanks $i'$ of said spools. Thus the spools $i\ k$ move but slightly from their normal position relatively to the axle-frame D, while the latter travels a considerable distance, relatively, to the car-frame across which it travels. The side rollers $e\ f$ of the frame D are also made in the form of spools, in the same manner as the rollers $i\ k$.

The frame D is provided at its corners with castings $r\ r'$, secured to said frame by riveting or otherwise. These castings are provided with the track $r''$, limited in its length by the projection $s$. The spools $e$ are placed upon the track in such a way that the shanks $e'$ of said spools travel upon said track in a vertical position, while the heads $e''$ of said spools press against the side plates $g\ h$ of the car-frame and roll thereon. Thus it will be seen only a slight movement takes place of the differential rollers $e\ f$ relatively to the axle-frame D, while said axle-frame travels a considerable distance relatively to the car-frame.

The plate $e^2$, secured to the projections or stops $s$, keeps the rollers $e\ f$ in position before the truck is secured to the car-body.

The swiveling frames B C are also provided with roller-bearings, conical rollers forming the center bearings and differential rollers forming the corner-bearings. These differential corner roller-bearings are shown especially in Figs. 1, 8, 9, and 10, in which the shank or shaft $u$, projecting from each side of the rollers $t$, travels on the tracks $v$, formed in the casting $w$, which is secured to the corners of the frame B, as shown.

The car-body is provided with plates which rest upon the peripheries of the rollers $t$. Thus when the axle-frame B swivels the shaft $u$ travels but a short distance on its tracks $v$, while the truck moves a considerable distance relatively to the car-frame in the manner already described in connection with the rollers $i\ k$ and $e\ f$.

The construction of the center bearing mechanism of the swiveling axle-frame B is as follows: The yoke-irons $a^2$ extend across the frame B edge upward and have one end riveted to the casting $b^2$, as shown at $c^2$, Fig. 1. Said casting $b^2$ is also riveted to the frame B, as shown at $h^2$. The opposite ends of the yoke-irons $a^2$ are riveted to the casting or plate $d^2$, as shown at $f^2$, while said casting $d^2$ is riveted or otherwise secured to the frame B, as shown at $g^2$. The center casting $i^2$ is riveted or otherwise secured to said yoke-irons $a^2$, as shown at $k^2$, Fig. 6. Said casting $i^2$ is provided with beveled tracks $l^2$ on one side of the axle $b^*$ and $m^2$ on the other side of said axle. On the track $l^2$ rests the conical roller $b^3$, and on the tracks $m^2$ on the opposite side of the axle rest the rollers $c^3$ at opposite sides of the swiveling center $a^3$. Said swiveling center $a^3$, it will be observed, is preferably placed on that side of the axle $b^*$ which is toward the center of the car. The casting or lower center plate $i^2$ is provided with an orifice $n^2$, while its upper part is provided with the annular flange $p^2$. The retaining-plate $q^2$ has openings $r^2$ and recesses $s^2$ for the reception and retention of the conical rollers $b^3\ c^3$. Said recesses $s^2$ drop over the central pins or projections $t^2$ of the conical rollers $b^3\ c^3$. Thus said rollers $b^3\ c^3$ are kept in the same position relatively to each other by said retaining-plate $q^2$, whatever their position may be relatively to said tracks $l^2\ m^2$. The retaining-plate $q^2$ is provided with an orifice $u^2$, through which projects, wholly or partly, the annular flange $p^2$ of the center plate $i^2$, whereby said retaining-plate $q^2$ is permitted, with the rollers $b^3\ c^3$, to revolve around the swiveling center $a^3$, but not to move materially otherwise.

The upper center plate G is bolted to the intermediate sills H of the car-frame A, as shown, and is provided on its under side with beveled tracks $e^3$, corresponding to the tracks $l^2\ m^2$ of the lower center plate $i^2$. Thus when the car-body is lowered down upon the truck the center plate G, sustaining the weight of the car, rests upon the conical rollers $b^3\ c^3$ and travels thereon with a minimum of friction.

It will be observed that the rollers $b^3$ and $c^3$ are on opposite sides of the axle $b^*$, so that the superincumbent weight resting upon the truck is distributed on both sides of the axle.

It is intended that the principal part of the weight sustained by the axle-frame or end truck B shall be supported by the center roller-bearings $b^3\ c^3$, a smaller proportion of this weight being supported by the corner-rollers $t$. Thus ease in swiveling is the better secured.

The center frame-coupler $f^3$ is provided with a slot $g^3$, in which is placed the roller bearing or thimble $h^3$. The pin $c$ passing through the coupler $k^3$ of the end axle-frame B passes also through the center coupler $f^3$ and the thimble $h^3$. Thus the axle-frames B and D are flexibly or adjustably connected together, the slot $g^3$ permitting an adjustable movement of said axle-frames relatively to each other when passing from a straight to a curved track or the reverse. The roller or thimble $h^3$ prevents undue friction when the coupling-pin $c$ travels along the slot $g^3$. The axle-frames C and D are coupled together in the same manner as the frames B and D just described.

I is a motor arranged in any usual or suitable manner to drive the axle $b^*$.

The fender or guard $l^3$, passing in front of the wheels $a^*\ a^*$, is supported by the brackets $m^3$, and these brackets in turn are riveted or otherwise secured to the saddle $n^3$. The saddle $n^3$ straddles and is supported by the box $p^3$ and said saddle supports the springs $q^3\ q^3$, which in turn support the truck or axle frame B and through it the car-body. The saddle $n^3$ is preferably provided with a horn or projection $r^3$ to which the brackets $m^3$ are secured.

The mode of operation is as follows: When the car A is traveling on a straight line the straight parallel rails keep the wheels $a^*$, $e^*$ and $c^*$ in line with each other, and consequently the axles $b^*$, $f^*$ and $d^*$ parallel to each other. When, however, a curve is reached the axle-frame D, impelled by the curving rails acting on the center wheels $e^*$, travels across the car-body A, and, through its flexible connections with the axle-frames B and C, causes the latter frames to swivel on their vertical axes $a$ and $b$. Thus the axles $b^*$, $f^*$ and $d^*$ are caused to take radial positions on curves and to become parallel on tangents. By this means the greatest possible ease is secured with a minimum of friction in passing curves.

My brake mechanism as applied to this truck will be understood from the following description:

The brake-beam $a'$, provided with the brake-shoes $b'$, is hung from the frame B by the links $c'$ in any usual or suitable manner. At the opposite or inner end of the frame B is suspended the intermediate brake-bar $d'$ by the links $f'$, the upper ends of said links being pivotally connected to the projection $g'$, which is riveted or otherwise secured to the frame B. Thus the brake-bar $d'$ is swingingly suspended from the frame B, whereby rattling is prevented.

The side rods $h'$ passing the sides of the motor I near the wheels, join the brake-beam $a'$ and the brake-bar $d'$. Said rods $h'$ have one end pivotally connected to the intermediate brake-bar $d'$, as shown at $k'$, while their opposite ends are screw-threaded and pass through eyes or orifices in said brake-beam $a'$, or through plates or castings $l'$ secured thereto. Nuts $m'$ placed on the screw-threaded ends of the rods $h'$ at opposite sides of the brake-beam $a'$ serve to adjust the brake-shoes to any desired distance from the wheels. It will be observed that the nose of the castings $g'$ projects some distance below the pivotal points $n'$ of the links $f'$ in said castings. It is evident, therefore, that the brake-springs $s'$ can throw the brake-beam $a'$ backward only until the swing-links $f'$ come in contact with the nose of the castings $g'$, as shown at the point $p'$. Thus the casting $g'$ serves as a stop to the backward movement of the brake-bar $d'$ and the brake-beam $a'$. Consequently the brake-shoes $b'$ are readily adjusted to a position in close proximity to the wheels, when desired, and this normal distance of the brake-shoes from the wheels remains constant until the brake-shoes become worn down. Placing the side rods $h'$ near the wheels, as shown, prevents any interference between the brake mechanism and the motor.

The end axle-frame C is provided with brake mechanism exactly similar to that just described in connection with the axle-frame B.

The vertical brake-lever $t'$ is supported at $w'$ by the swing-link $u'$, which latter straddles and is supported by the I-beam $v'$, which forms a part of the truck. The plate or casting $a''$ keeps the swing-link $u'$ in position relatively to the I-beam $v'$, as shown. The rod $b''$ has one end pivotally connected to the intermediate brake-bar $d'$ at $c''$ and the other end to the lever $t'$, as shown at $d''$. The brake-lever $t'$ has its lower end provided with the link $f''$, pivoted thereto at $i^*$, while the equalizing-bar $g''$ is pivoted at $h''$ to the opposite end of said link $f''$. The brake-rod $k''$ from the brake-bar $l''$, which applies the brakes to the wheels of the axle-frame C, has its inner end pivotally connected to said equalizing-bar $g''$, as shown at $m''$, while the brake-rod $n''$ from the brake-beam $o''$ of the center wheels $e^*$, has its inner end pivotally connected to the opposite end of the equalizing-bar $g''$, as shown at $p''$. The rod $q''$ has one end pivotally connected at $s''$ to the upper or outer end of the lever $t'$ and its opposite end to the horizontal brake-lever $t''$, as shown at $u''$. The horizontal brake-lever $t''$ is pivoted to the I-beam $v'$, as shown at $v''$, and from the outer end of said lever $t''$ the brake-rods $w''$ extend to the brake staves or levers attached to the car-bodies, and through which the brakes are operated.

The operation is as follows, assuming the brakes to be off: When it is desired to apply the brakes, power is applied through one of the rods $w''$ to the horizontal lever $t''$, which is thus caused to turn on its axis. The movement of the lever $t''$ draws forward the rod $q''$ and the upper end of the vertical lever $t'$. This movement draws the rod $b''$ forward in the same direction and carries the brake-rods $k''$ and $n''$ in the opposite direction. The brake-lever $t'$ has normally no fixed fulcrum, and the above-described movement continues until the brakes are set on one pair of wheels—for instance, the wheels $a^*$—when $d''$ becomes a fulcrum for said lever. The lever $t'$ now continues to move on the fulcrum $d''$ until the brakes are applied to another set of wheels—for instance, the wheels $c^*$—when the equalizing-bar $g''$ becomes a lever with its fulcrum at $h''$. The lever $t'$ still continues its movement and draws the lever $g''$ back around its fulcrum $h''$ until the brakes are applied to the wheels $e^*$. Thus the movement of the lever $t''$ applies the brakes to all the six wheels of the truck with an equal pressure, limited only by the power applied to the rods $w''$. In some cases, however, it is desirable to apply the brakes to different wheels with an unequal pressure—for instance, in electric cars—when motors are applied to some wheels of a truck and not to others. In this case the momentum of the heavy and rapidly-revolving armature will cause the driving-wheels to revolve for some time under a brake-pressure which will stop the wheels which are not drivers. This is a serious objection, both on account of the liability of making flat wheels by sliding the non-drivers and because the sliding wheels will not stop the car as quickly as if they were kept revolving slightly until the instant that the wheels and car come to a standstill together. When, therefore, unequal brake-pressure is to be applied to different wheels, I construct the equalizing bar or lever $g''$, as shown—that is, with one end longer than the other. Thus, as will be seen, the end of the equalizer $g''$, between the points $h''$ $p''$, is twice as long as the other end between the points $h''$ $m''$. By this arrangement, as is evident, the brake-pressure applied to the wheels $e^*$ through the brake-rod $n''$ is only half as great as that applied to the other wheels, $a^*$ and $c^*$.

It will be understood, of course, that by this method the brake-pressure to be applied to different wheels may be proportioned as desired.

When the pressure is removed from the lever $t''$ the brakes are released from the wheels in any usual or suitable manner—for instance, by their own weight or by the springs $s'$ $s'$.

It will be observed that the to-and-fro swinging movement of the brake-lever $t'$ on its link or support $u'$ compensates for any irregular adjustment or wear of the brake-shoes with reference to the different wheels and causes the prompt application of the brakes to all the wheels without regard to such irregularities.

The link $u'$ may be pivotally connected to any suitable part or connection of the truck, but I prefer, as a matter of convenience, to apply it to the beam $v'$, as described.

The plate $g^*$, secured to the beam $v'$, has projections $h^*$ extending outwardly at each side of the link $u'$, as shown, whereby the movement of the link $u'$ is limited. By this arrangement, in case one of the brakes or brake-rods should become broken or disconnected, the movement of the lever $t'$ will first result in bringing the link $u'$ against one set of projections $h^*$, thus giving the lever $t'$ a fixed fulcrum at $w'$. The further movement of the lever $t'$ on this fulcrum $w'$ will then apply the undisabled brakes to their respective wheels. Thus it is evident the disabling of one set of brakes does not disable the others.

The stops $h^*$ may be used in connection with any suitable part of the brake apparatus to produce the results described and yet be in accord with the spirit and purpose of this part of my invention.

When it is desired to apply the brakes to any two sets of wheels by the lever $t'$ the brake-rod $b''$ is pivoted to the lever $t'$, as already described, and the brake-rod $k''$ or $n''$, as the case may be, is pivotally connected at $i^*$ directly to the lever $t'$.

When the radial truck is used without motors the brake-rods $b''$ and $k''$ may be extended and connected, respectively, directly to the brake-beams of the axle-frames B and C, thus dispensing with the intermediate brake-bars $d'$ $l''$ and the side rods $h'$.

The braces $u^3$ $v^3$ extend from the bottom of the spring-posts $t^3$ to the truck-frame B, to which the upper ends of said braces are secured, as shown. The lower ends of the posts $t^3$ $t^3$, which are shouldered, pass through the brace $s^3$, as well as through the braces $v^3$. The nuts $k^*$ secure said posts $t^3$ and braces $v^3$ $s^3$ firmly together. The bolts $l^*$ bind the braces $u^3$, $v^3$, and $s^3$ securely together, as shown. Thus the lower ends of the posts $t^3$ are securely braced and held rigidly in position. At the same time when it becomes necessary to remove the wheels and axles or journal-boxes it is only necessary to remove the short brace $s^3$ and raise the axle-frame B bodily from the journal-boxes $p^3$ without disturbing the springs or any other part of said axle-frame than the short braces $s^3$ aforesaid. In like manner by removing the short braces $w^3$ the center frame D may be raised bodily from its journal-boxes, whereby the wheels and axles are conveniently and readily removed or replaced.

Having thus described my invention, what I claim as new, and desire to secure by Letters Patent, is—

1. In a car-truck, a frame made of a single continuous piece of rolled channel-bar bent at the corners and having its ends secured by riveting or otherwise, said channel-bar having its web in a vertical position and its flanges in a horizontal position, substantially as described.

2. In a car or truck, the combination, substantially as described, of a main frame, two supplemental frames swiveling thereon, and an intermediate frame moving transversely across the main frame and flexibly connected to said swiveling frames, said supplemental frames being made of single continuous channel-bars curved at the corners and having their webs in a vertical position and flanges in a horizontal position.

3. In a car or truck, the combination, substantially as described, of a main frame, a supplemental wheel-frame moving transversely relatively thereto, cross timbers or pieces secured to said main frame in proximity to the ends of said supplemental wheel-frame and horizontal roller-bearings between the ends of said supplemental frame and said cross timbers or pieces on said main frame.

4. In a car or truck, the combination, substantially as described, with the main frame and a supplemental wheel-frame moving transversely relatively thereto, of a differential horizontal roller having a vertical axis bearing on a track on one of said frames and its periphery bearing against a track on the other frame.

5. In a car or truck consisting essentially of a main frame, two supplemental wheel-frames swiveling thereon and an intermediate wheel-frame moving transversely between said swiveling frames, the combination, with said transversely-moving frame, of a brake-lever supported thereby, said brake-lever being arranged to apply or control the brake mechanism of said truck, substantially as described.

6. In combination with the transversely-moving wheel-frame D, the horizontal brake-lever supported thereby and arranged to apply or control the brakes on the end truck-frames B, C, through suitable mechanism, substantially as described.

7. In a car-truck, the combination, with the transversely-moving wheel-frame D of an upright lever supported by said frame, brakes arranged to stop the wheels of the end truck-frames B and C and suitable mechanism connecting said brakes to said upright lever whereby the latter controls the operation of said brakes, substantially as described.

8. In a car-truck consisting essentially of two swiveling and a laterally-moving intermediate axle-frame, the combination with said laterally-moving intermediate frame, of brakes arranged to control the motion of the wheels of said laterally-moving frame and a brake-lever supported by said frame and arranged to control the action of said brakes, substantially as described.

9. In a car-truck consisting essentially of two swiveling and one laterally-moving intermediate wheel-frames, flexibly connected together, the combination with brakes, applied to all the wheels of said frames, of a lever supported by said laterally-moving frame, and mechanism connecting all of said brakes to said lever, whereby the latter will control the action of all of said brakes, substantially as described.

10. In a six-wheeled radial truck consisting essentially of two swiveling and one laterally-moving intermediate wheel-frames with their wheels, the combination, substantially as described, with brakes applicable to all of said wheels, of a horizontal and an upright brake-lever coupled together and both supported on said laterally-moving frame, and mechanism connecting said levers and all of said brakes in one system, whereby said levers will control the action of said brakes.

11. In a six-wheeled radial truck consisting essentially of two swiveling and one laterally-moving intermediate wheel-frames, with their wheels, the combination, substantially as described, of brakes applicable to all of said wheels, intermediate brake-bars parallel to the brake-beams of the end trucks and connected thereto by connecting-rods, a lever supported by the laterally-moving truck-frame and a pull-rod connecting said intermediate brake-bar to said lever.

12. In a six-wheeled radial truck consisting essentially of two swiveling and one laterally-moving intermediate wheel-frames, with their wheels, the combination, substantially as described, of brakes applicable to all of said wheels, brake mechanism connecting the brakes of one of the end wheel-frames to an upright lever supported by the intermediate wheel-frame, brake mechanism connecting the brakes of the other end wheel-frame and the brakes of the center pair of wheels to opposite ends of a proportional lever, said proportional lever being coupled to said upright lever, whereby said upright lever applies and regulates the pressure of all the brakes upon their respective wheels.

13. In combination, substantially as described, the intermediate horizontal brake-bar $d'$ located in a position parallel to the brake-beam and connected thereto by connecting-rods $h'$, the truck or wheel frame B, and the suspension-links $f'$ suspending said horizontal brake-bar $d'$ flexibly from said truck-frame.

14. The combination, substantially as described, with the intermediate horizontal brake-bar $d'$, the frame B and the links $f'$, of the link-supports $g'$ forming stops to limit the backward swing of said links.

15. The combination, substantially as described, of the truck-springs located at opposite sides of the axle-box, spring-posts $t^3$ passing through said springs and having their upper ends secured to the truck-frame and their lower ends shouldered and screw-threaded, side braces $v^3$ located outwardly from each of said spring-posts, said braces having their upper ends secured to the truck-frame and their lower ends provided with orifices, passing over the lower ends of said spring-posts respectively, and secured against the shoulders of said posts, and the bottom brace $s^3$ passing over the ends of said posts below said side braces, said posts, side and bottom braces being securely fastened together by the nuts $k^*$ on the ends of said posts, said side and bottom braces being additionally secured together outside of said spring-posts, by the bolts $l^*$.

16. In a car-truck consisting essentially of two swiveling and one laterally-moving intermediate frames, with their wheels, the combination, substantially as described, with brakes applicable to the wheels of said swiveling frames, of a horizontal and an upright brake-lever coupled together and both supported by said laterally-moving frame, and mechanism connecting said levers and said brakes in one system, whereby said levers will control the action of said brakes.

17. In a car-truck consisting essentially of two swiveling and one laterally-moving intermediate frames, with their wheels, the combination, substantially as described, of brakes applicable to the wheels of said swiveling or end truck-frames, intermediate horizontal brake-bars parallel to the brake-beams of said swiveling frames and connected to said brake-beams by connecting-rods, a lever supported by the laterally-moving truck-frame and pull-rods connecting said intermediate brake-bars to said lever.

18. In a car-truck, the combination, substantially as described, of a brake-beam provided with brake-shoes, a brake-bar hung or suspended parallel to said brake-beam and capable of swinging in a horizontal plane, rods connecting said brake-beam and brake-bar together, a brake-lever controlling the application of the brakes to said truck, and mechanism connecting said brake-lever and parallel brake-bar together, whereby the horizontal movement of said suspended brake-bar will control the application of the brakes through said brake-beam.

WILLIAM ROBINSON.

Witnesses:
J. I. McDONALD,
D. O'NEILL.